Aug. 31, 1965  E. H. JACOBSEN ETAL  3,203,485
ROTATING MOUNTING SYSTEM FOR HELICOPTER AUXILIARY EQUIPMENT
Filed Jan. 8, 1964  2 Sheets-Sheet 2
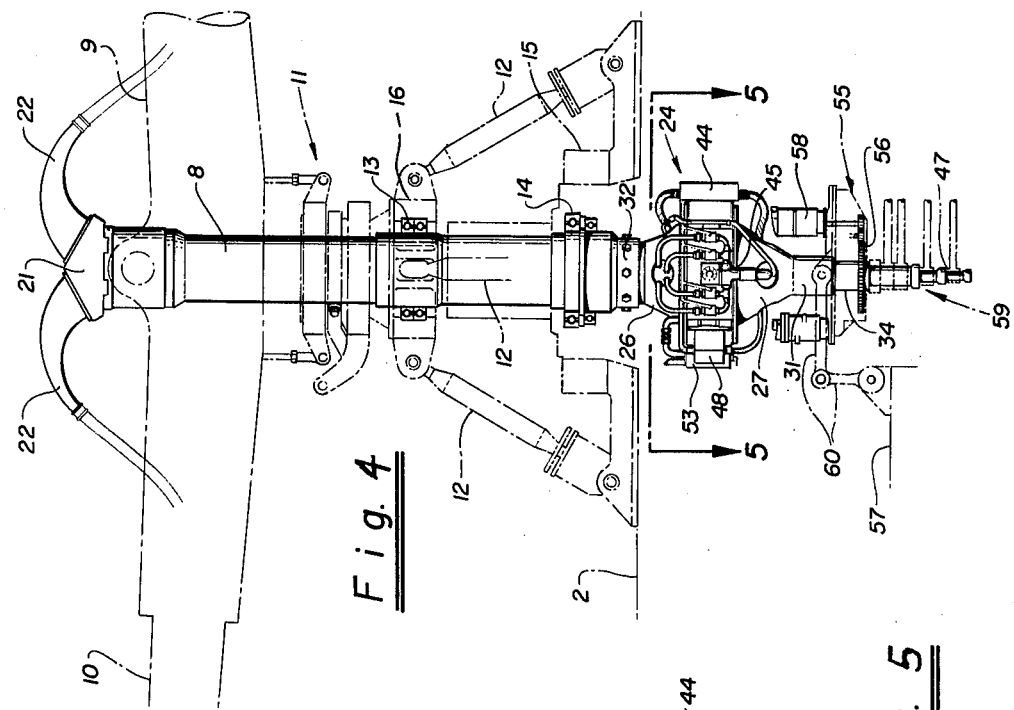
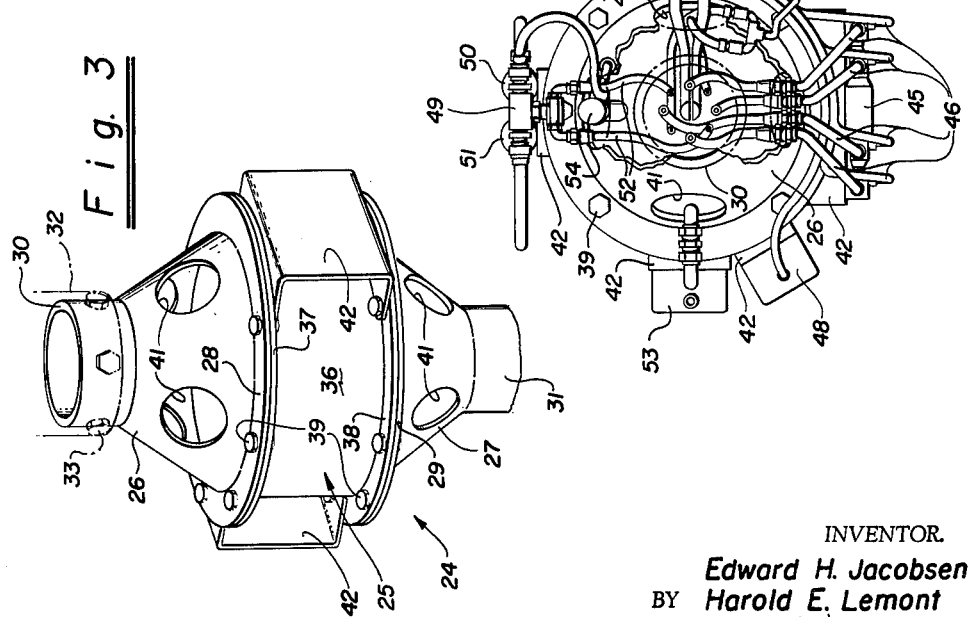
INVENTOR.
Edward H. Jacobsen
Harold E. Lemont
BY
Bialos & Schlemmer
Attorneys 3,203,485
ROTATING MOUNTING SYSTEM FOR HELICOP-
TER AUXILIARY EQUIPMENT
Edward H. Jacobsen and Harold E. Lemont, Menlo Park,
Calif., assignors, by mesne assignments, to Hiller Air-
craft Company, Inc., Menlo Park, Calif., a corporation
of Delaware
Filed Jan. 8, 1964, Ser. No. 336,500
6 Claims. (Cl. 170—135.4)

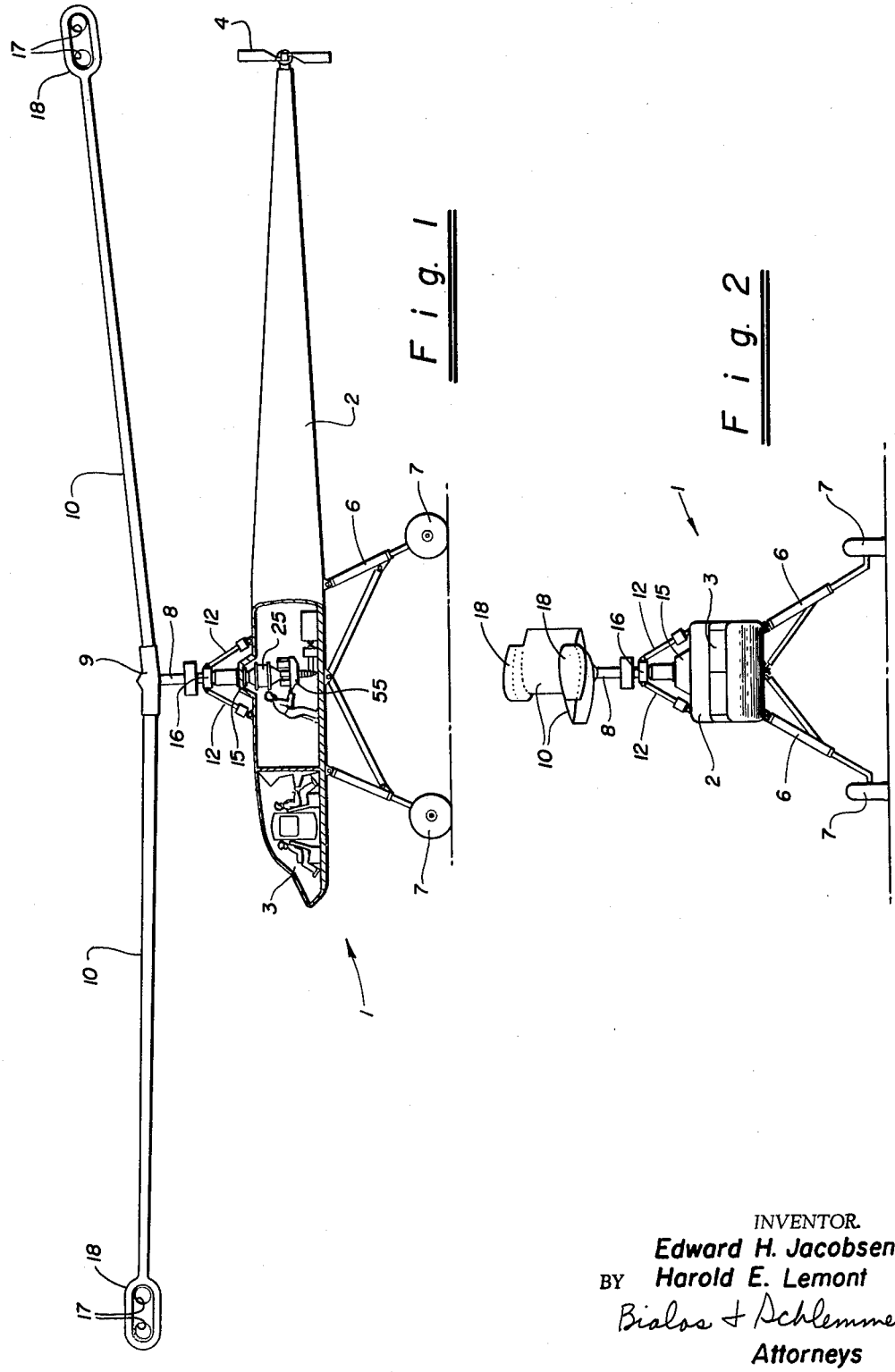

This invention relates to a rotor system for a helicopter. More particularly, this invention relates to a helicopter rotor system which may be operatively embodied in an aircraft or in a rotor whirl test stand employed for helicopter rotor testing purposes. Still more particularly this invention relates to a helicopter rotor system which incorporates therein means for mounting auxiliary operational and test equipment employable in conjunction with a helicopter rotor so that such equipment is rotatable with the rotor column and the rotor blades of the rotor system.

While this invention has particular utility when employed in conjunction with a rotor system which utilizes power sources mounted on the rotor blades for driving the rotor, its utility is not limited to such an arrangement and this invention may also be employed with more conventional rotor drive power sources. In this same vein, while this invention has particular utility when employed in conjunction with rotors for extremely large helicopters, frequently referred to as flying cranes, it also may be utilized in smaller helicopters.

In rotor systems for very large helicopters, it has been found effective to utilize jet engines mounted adjacent the rotor blade tips as a power source for actuating the rotor. In this regard, turbo-jet engines are particularly effective as a rotor power source for large size helicopters of the type illustrated in the accompanying drawings. The relatively light weight of turbo-jet engines, when considered in conjunction with their capacity to produce great thrusts, make the same particularly well suited in a helicopter rotor system for large flying crane type helicopters. While hereinafter this invention will be described in conjunction with turbo-jet powered rotors, its utility is not limited to use in such an arrangement, as above noted.

When blade tip mounted jet engines are employed in a helicopter rotor system, it has been determined that certain types of auxiliary equipment of the rotor system by its very nature must be placed in definite and particular locations in the system, while other types of equipment have greater flexibility and freedom in respect to their placement in the system. In this regard, it has been determined that considerations such as the following generally apply to the selection of locations for installation of auxiliary equipment associated with the jet engines and other components of the rotor system.

(1) A minimum of equipment should be located at or adjacent the tips of the respective rotor blades since any such equipment there located will be subjected to high "g" loading. Also, any such tip mounted auxiliary equipment will use up valuable space in a congested area in which all available space is desired for equipment relating directly to the tip mounted engines. Furthermore, any equipment mounted at the blade tip contributes to the total centrifugal force to be overcome in the rotor design and therefore such tip mounting should be minimized whenever possible. Additionally, tip mounted equipment is less easily accessible for inspection, maintenance and replacement than equipment mounted elsewhere in the rotor system as hereinafter discussed.

(2) Auxiliary equipment cannot logically be located within the rotor blades themselves inwardly of the blade tips without seriously compromising on effective blade design. Most effective and optimum blade design will preclude the ready access required for inspection, maintenance and replacement of certain auxiliary equipment. Furthermore, the mounting of equipment within a blade spar gives rise to the same sort of problems mentioned above with respect to tip mounted equipment, namely, high "g" loading and centrifugal force problems. However, such problems of spar mounted equipment will exist to a somewhat lesser degree due to the greater closeness of any such equipment to the axis of rotation of the rotor system.

(3) The rotor hub or head lies in a low "g" field and is not enclosed, as are the blade spars. Therefore, limitations as above noted on equipment mounting within the blade are not necessarily applicable to hub mounted equipment. However, equipment installation in the hub area also should be minimal due to particular problems which are encountered due to the complex motions which exist in the hub area when the rotor is rotating. For example, hub mounted auxiliary equipment results in dynamic problems due to weight buildup above the rotor teeter point, and disadvantageous hub bulkiness. Also, hub mounted equipment is not desirable because of inaccessibility, particularly in large size helicopters, which makes inspection, maintenance and replacement unnecessarily troublesome. While it is envisioned that certain types of auxiliary operational or test equipment may be mounted when necessary in the hub area of large tip jet driven helicopter rotor systems (such as high speed cameras for viewing movements and conditions existing along the lengths of the blades during rotation), hub mounted operational and test equipment generally is not desired.

(4) Auxiliary operational and test equipment cannot logically be mounted within or through the rotor column itself because of space considerations, and because such equipment would generally be inaccessible for inspection, maintenance and replacement.

The most effective location for auxiliary operational and test equipment for a rotor system has been determined to be intermediate the ends of the rotor column, preferably adjacent the base of the column. When the rotor system of this invention is used in an actual aircraft, this preferred location will fall within the fuselage of the aircraft so that inspection, maintenance and replacement, when necessary can be effected during flight. Similarly if this mounting location is employed in a rotor whirl test stand assembly, similar easy access is available. Such a location also is preferred because it falls within a low "g" field, where space is not at a premium. Also, because of the configuration of the equipment mounting means of the invention, and placement of such equipment mounting means between upper and lower portions of the column, equipment can be mounted at the axis of the rotor column coaxially with the column to minimize centrifugal loading forces and imbalance. Further advantages will become apparent from the remainder of the disclosure herein.

From the foregoing, it should be understood that this invention relates particularly to a rotor system for a helicopter which includes means positioned adjacent the base of the rotor column of the system in an accessible location on which auxiliary operational and testing equipment may be mounted. Preferably and importantly such mounting means is arranged so as to be rotatable directly with the rotor column and concentrically therewith. Thus, there is no relative motion between equipment thus mounted and the rotor column. As a result, the need for slip ring connections for electrical and fluid lines is minimized and in many cases eliminated.

The mounting means provided for this purpose takes the form of a mounting platform structure secured directly to the rotor column intermediate its ends, preferably adjacent its base, so as to be rotatable directly therewith. It is on such platform structure that the auxiliary operational and test equipment discussed herein is positioned for rotation in unison with the rotor column and the blades operatively connected therewith.

By way of contrast, certain types of operational and test equipment, by its very nature, must be non-rotatably mounted and it should be understood that this invention does not relate to such other equipment, other than in the manner in which the same relates to and cooperates with rotatably mounted auxiliary equipment.

From the foregoing, it should be understood that objects of this invention include the provision of a rotor system for a helicopter; the provision of a helicopter rotor system well adapted for use in conjunction with blade tip mounted jet engines; the provision of a helicopter rotor system which includes means in conjunction therewith for mounting operational and test equipment for rotation therewith; the provision in a helicopter rotor system of an equipment mounting platform structure mounted adjacent the base of a rotor column of the system upon which auxiliary equipment may be mounted for rotation with the rotor column and the blades attached thereto; and the provision in a helicopter rotor system of equipment mounting means located in a low gravity and centrifugal force area in which equipment there mounted is readily accessible for inspection, maintenance and replacement.

These and other objects of this invention will become apparent from a study of the following description, in which reference is directed to the accompanying drawings. In this regard, it should be understood that while features of the helicopter rotor system disclosed and described herein have been illustrated in conjunction with a very large flying crane type helicopter, the applicability and usefulness of this invention to helicopters of smaller size is also practical and is envisioned within the scope hereof.

FIG. 1 is a side elevational view of an exemplary helicopter with which this invention is well suited for use;

FIG. 2 is a front elevational view of the helicopter of FIG. 1;

FIG. 3 is an isometric view of a preferred embodiment of the equipment mounting means of this invention secured intermediate the ends of a rotor column for rotation therewith;

FIG. 4 is a generally schematic view showing the relationship of the equipment mounting means of this invention relative to other components of the subject rotor system;

FIG. 5 is a horizontal sectional view through the rotor system taken in the plane of line 5—5 of FIG. 4.

Referring first to FIGS. 1 and 2, as noted previously, this invention has particular utility when employed with a very large size helicopter, or in conjunction with a whirl stand facility for testing the rotor of such a large size helicopter. In the drawings, a flying crane type helicopter, generally designated 1, has been illustrated. Such a helicopter includes a fuselage 2 having a pilot and engineer station 3 at the forward end thereof. A directional and yaw control tail rotor 4 is mounted at the tail end of the fuselage for the well known purpose. Rotation of the tail rotor is effected by any suitable means (not shown).

As seen in FIG. 1, the fuselage is of sufficient size to permit movement by a crewman through its interior. Thus, various components of the aircraft rotor system may be visually inspected during flight by the helicopter crewman. Similarly, load distribution within the helicopter may be checked during flight. In this same vein, if the rotor system of this invention is employed in a test stand facility, the means provided in conjunction with the rotor column for mounting auxiliary equipment will be similarly accessible for inspection and maintenance.

The illustrated helicopter is supported on a landing surface by an undercarriage or landing gear 6 which in the illustrated embodiment includes a series of pneumatic wheels 7. Preferably the opposing portions of the landing gear of the helicopter illustrated are sufficiently widely spaced so that the fuselage may be positioned over a load to be supported beneath the fuselage during flight. In this connection, it should be understood that the landing gear shown, as well as the overall configuration of the helicopter shown, are illustrated merely for purposes of example and that modifications thereto are contemplated.

Projecting upwardly from the fuselage in the helicopter embodiment illustrated is a rotor column 8 which is surmounted by a rotor hub or head 9 from which radiate two or more rotor blades 10. These blades are operatively connected with the rotor column by means of the rotor head 9 so as to be rotatable with the rotor column in well known fashion. Details of the rotor head construction, such as the particular mechanism employed for varying the collective and cylic pitch of the rotor blades, have not been illustrated or described in this application in that such details form no direct part of the present invention, and further because such details may vary with the particular type of helicopter and rotor system employed. However, for purposes of general illustration, a portion of the rotor blade pitch control mechanism of the rotor head assembly has been shown generally at 11 in phantom lines in FIG. 4. Additionally, by way of example only, the rotor head assembly employed may embody the construction disclosed in Hiller et al. Patent No. 2,631,679, dated March 17, 1953. Preferably, hydraulical or mechanical-electrical assist means will be provided to actuate the rotor head components.

The rotor column 8 is supported in the helicopter embodiment illustrated by means of two or more brace structures 12 which extend between the top of the fuselage of the helicopter and the rotor column beneath the rotor head structure. As seen in FIG. 4, the rotor column is supported for rotation about its upright axis by two or more spaced bearing assemblies 13 and 14. The bearing assemblies 13 and 14 are mounted respectively in a lower supporting collar 15 adjacent the top of the fuselage and in an upper supporting collar 16 supported by the aforementioned brace structures 12.

As noted previously, the rotor column of the subject bearing assembly may be driven by any effective power source. Preferably, in a large size helicopter of the type shown, the power source employed comprises at least one engine 17 mounted on each of the rotor blades 10, most effectively, and therefore preferably, at or closely adjacent the tips of the respective blades. In the embodiment illustrated two engines 17 are mounted at each blade tip in an inboard-outboard side-by-side arrangement in a nacelle 18 of any suitable construction secured to the outboard end of the blade.

It should be understood in this regard, that other mounting arrangements for a pair of engines, such as an over and under mounting, could be employed, and also that more than or less than two engines could be employed on each blade, depending upon the power requirements of the particular aircraft. As noted previously, the engines actually employed preferably are of the turbo-jet type and, by way of example, one engine construction which may be employed is designated the J69–T–29 engine manufactured by Continental Aviation and Engineering Corporation.

When tip mounted turbo-jet engines of the type disclosed herein are employed, such engines require electrical current and operating fluids, such as fuel and lubricating oil, to be supplied thereto. The supply aspect of the helicopter rotor system is not embodied in the present invention and details thereof are not disclosed herein. In this connection, however, by way of example and referring to FIG. 4, it should be understood that in an arrangement of the type shown, rotor column 8 preferably is hollow so that electrical and fluid supply lines may be positioned to extend longitudinally upwardly therethrough. Such supply lines project from the top of the rotor head as at 21 in the form of flexible conduits 22 which permit teeter movement of the rotor head and blades therewith during operation of the rotor system. In this regard, it should further be understood that such conduits 22 extend from the rotor head into and extend longitudinally of the rotor blades to the jet engines mounted at the tips thereof and thus carry electrical current, fuel and lubricating fluids, and other essential products to the engines as required.

Means providing a mounting base for mounting auxiliary operational and test equipment is generally designated 24 and is positioned in conjunction with the rotor column at an accessible location within the fuselage of the helicopter, or at a similarly convenient location in a test stand installation, intermediate the opposite ends of the rotor column and preferably adjacent the base thereof. Such means comprises an equipment mounting platform structure 25 secured to the rotor column so as to be rotatable therewith. This mounting platform structure thereby provides a mounting base for auxiliary test equipment or operational equipment which by its nature preferably is mounted for rotation with the rotor column. By thus positioning the auxiliary equipment for rotation with the rotor column, as noted previously the need for extensive slip ring connections for electrical and fluid supply lines extending to the tip mounted jet engines is greatly minimized or eliminated in that many supply lines may extend directly from the respective rotating equipment to the jet engines through the rotor column and rotor blades. This minimization of slip rings is particularly important for rotor testing purposes in that during testing extremely large numbers of slip rings heretofore were required. Furthermore, minimization of slip rings for fluid connections obviates the dangers of fluid leakage between a rotating member and a non-rotating member. Thus, leakage problems which might otherwise be encountered if the auxiliary equipment were stationarily positioned are minimized or eliminated.

By thus providing a rotatable equipment mounting platform structure for rotor system accessories, such accessories are easily accessible and, when employed in a helicopter as shown in FIG. 1, are viewable during flight for safety check and maintenance purposes.

In the illustrated embodiment, the mounting platform in effect is interposed between upper and lower portions of the rotor column coaxially therewith and completely surrounding the axis thereof and operatively interconnects the rotor column so that the upper and lower portions rotate in unison. While the platform structure may take various configurations and constructions, in the illustrated embodiment the same comprises a pair of upper and lower connecting web members 26 and 27 each of which includes a generally flat peripheral flange 28 and 29 respectively. Each of the connecting members 26 and 27 also includes a generally cylindrical extension 30 and 31 respectively of less diameter than the flanges. Thus, each connecting web member has a generally funnel shape as best seen in FIG. 3.

The upper connecting member 26 is dimensioned so that its cylindrical extension 30 is receivable within a portion 32 of the rotor column 8 as seen in FIGS. 3 and 4. The connecting member 26 and the rotor column portion 32 are secured together for rotation by a series of bolts 33, or other suitable fastening means, as shown.

The lower connecting web member 27 is similarly secured to a bottom portion 34 of the rotor column as also seen in FIGS. 3 and 4.

A generally cylindrical platform portion or housing 36 is interposed between the respective connecting members 26 and 27 and is secured thereto so that the mounting platform structure and the rotor column portions are rotatable together as a unit. In this regard, in the illustrated embodiment the cylindrical platform portion is provided with upper and lower peripheral flanges 37 and 38 respectively which correspond in dimensions to the flanges 28 and 29 of the connecting members as seen in FIG. 3. Bolts 39 or other suitable fastening means are employed to operatively interconnect the cylindrical platform portion 36 with the connecting members shown. Preferably, for purposes of weight conservation and to give access to the interior of the rotating platform structure, each of the connecting web members is provided with a series of apertures 41 in the conical portions thereof.

It is to the cylindrical platform portion 36 of the platform structure that the auxiliary operational and testing equipment employed in the rotor system is mounted. In this regard, as seen in FIG. 3, suitable brackets 42 may be positioned selectively about the periphery of the cylindrical platform portion 36 as required, depending upon the nature and quantity of equipment to be mounted for rotation with the platform structure. In this connection, as shown in FIG. 3, such brackets may be secured to the platform structure by means of the bolts 39 which connect together the respective components of the platform structure as above described, or other suitable means such as welding could be employed if desired.

It should be understood that the platform structure illustrated is positioned concentrically with respect to the axis of rotation of the rotor column and is rotatable directly with the rotor column upon rotation of the column and rotor blades by the power source of the helicopter. Moreover, the platform structure including housing 36 has a greater diameter than and projects laterally beyond both the upper and lower portions of the column, thus providing ample space for support of the aforementioned auxiliary equipment.

Referring to FIG. 5, the number of mounting brackets 42 employed on the platform structure will vary depending upon the nature of and the amount of auxiliary equipment to be supported by the platform structure. In this regard, by way of example, operational equipment which may be mounted for rotation with the rotor column may include electrical junction boxes, various electronic units, fluid boost pumps, pressure regulators, fluid filters and like units required in the fluid replenishment system for the tip mounted engines, fuel supply manifold units, fire extinguisher components, and the like. When the subject rotor system is employed in testing operations, other equipment may be mounted on the platform structure which may include various photographic mechanisms or television mechanisms, data storage and recorder mechanisms, telemetering devices, oscillographs and the like. Also, when the rotating platform structure is employed in test techniques, stroboscopic light may be employed to view various pieces of such auxiliary equipment during rotation thereof with the rotor column.

It should be understood of course that this invention is not restricted to the mounting of any particular type of operational or test equipment, but rather resides in the provision in conjunction with a rotor system of means for mounting various operational or test mechanisms and equipment which may effectively be rotated in conjunction with the rotor column and in unison therewith.

FIGS. 4 and 5 illustrate this invention actually utlized for mounting various pieces of operational equipment. By way of example, an electrical junction box 44 is secured to the platform structure. Similarly a fuel manifold unit 45, from which a plurality of fuel lines 46 project upwardly through the rotor column and into the blades to the respective jet engines, is mounted thereon. The fuel manifold in turn is connected with a fluid supply (not shown) via a slip ring connection and conduit designated 47 as seen at the bottom of FIG. 4. An electronic fuel governor 48 also is mounted on the platform. By way of further example, a lubrication oil replenishment system, including an oil manifold unit 49, a filter 50 and boost pump 51 (from which extend a series of lube oil replenishment supply lines 52 which also extend upwardly through the rotor column) also is mounted for rotation. An oil vent tank structure 53 also is secured to the platform.

In this connection, the oil replenishment system which may be employed in this arrangement may be of the type disclosed in Nichols and Bonnell application, Serial No. 331,281, filed December 17, 1963, and entitled "Aircraft Engine Lubrication System." If such an oil replenishment system is employed in conjunction with the rotor system of this invention, the cylindrical platform 36 on which the various mounting brackets 42 are positioned may take the form of an enclosed tank, having a fill spout 54, in which supply of lubricating oil may be retained. For details of such a rotatable oil replenishment system, reference is directed to that application.

While in FIGS. 3 and 4 various exemplary equipment for the helicopter rotor system are shown, details of such components have not been described herein in that they form no part of this invention.

By way of further example, the rotor system also may include non-rotatable components supported thereby, such as a gear box 55 in which various gear trains 56 are positioned for rotation by a main gear driven directly by the rotatable rotor shaft. The gear box 55 is secured against rotation with the rotor shaft by means of a rotation preventing linkage 60 secured at one of its ends to lugs projecting from the top of the gear box and at its other end to a portion 57 of the fuselage of the helicopter as shown schematically in FIG. 4. Suitable non-rotatable equipment may be mounted on the gear box, such as an electrical generator 58 for driving the boost pump of the lubrication system described above.

Positioned beneath the non-rotatable gear box are a series of slip ring connections generally designated 59 by means of which other non-rotatable components of the rotor system may be operatively connected with their rotatable operative or test mechanisms thereof. Only several such rotary electrical and fluid slip ring connections have been shown but it should be understood that in an actual system, many such connections may be employed.

Having thus made a full disclosure of this invention, reference is directed to the appended claims for the scope of protection to be afforded thereto.

We claim:

1. In a helicopter comprising a fuselage, a rotor system in conjunction with said fuselage comprising a rotor column having a lower portion within said fuselage and an upper portion partly above and extending into said fuselage coaxial with and spaced from said lower portion, means above said fuselage fixedly secured to the top thereof mounting said rotor column for rotation relative to said fuselage, a rotor hub atop said rotor column, rotor blades surmounting said column and operatively connected with said hub for rotation therewith above said fuselage, means for rotating said rotor column and said blades, and equipment mounting means in conjunction with said rotor column within said fuselage; said equipment mounting means comprising a platform structure secured to and integral with said rotor column intermediate the ends thereof, said structure being interposed between and rigidly interconnecting said upper and lower portions of said rotor column and including a generally cylindrical tank housing member coaxially occupying the space between and of a greater diameter than and projecting laterally beyond said upper and lower portions of said rotor column to provide on the axis of the rotor column a supporting base completely surrounding said axis, and auxiliary equipment for said helicopter mounted on said supporting base for attendant rotation in unison with said rotor column and said blades, said equipment on said base being accessible within said fuselage during flight and testing of said helicopter and said rotor system.

2. The helicopter of claim 1 in which said means for rotating said rotor column and said blades comprises jet engines mounted on said blades adjacent the tips thereof.

3. The helicopter of claim 1 in which said equipment mounted on said supporting base is auxiliary operational equipment for said rotor system, said equipment including electrical and supply assemblies in conjunction with said means for rotating said column and blades.

4. The helicopter of claim 1 in which said equipment mounted on said supporting base is auxiliary test equipment for said rotor system.

5. A helicopter rotor system comprising a rotor column having axially spaced apart upper and lower coaxial portions, rotor blades surmounting the upper portion of said rotor column and operatively connected thereto for rotation therewith, means for rotating said rotor column and said blades about the axis of said rotor column, equipment mounting means positioned coaxially with and occupying the space between said upper and lower portions of said rotor column and rigidly connecting together said upper and lower column portions for attendant rotation in unison therewith; said equipment mounting means including a platform member rigidly connected between, surrounding, and of a greater diameter than said upper and lower portions of said column, and projecting laterally beyond said upper and lower column portions; and auxiliary equipment for said rotor system mounted on said platform about and close to the axis of said rotor column to minimize centrifugal forces on said equipment due to rotation thereof with said rotor column.

6. A helicopter comprising a fuselage having a top, a rotor column having axially spaced apart upper and lower coaxial portions, rotor blades surmounting the upper portion of said rotor column and operatively connected thereto for rotation therewith, means for rotating said rotor column and said blades about the axis of said rotor column; equipment mounting means coaxially occupying the space between and rigidly connecting together said upper and lower portions of said rotor column for attendant rotation in unison therewith, said equipment mounting means surrounding the axis of said rotor column and comprising an upper connecting web member rigidly secured to the upper portion of said column, a lower connecting web member rigidly secured to the lower portion of said column, and a platform member positioned between said web members and secured rigidly thereto coaxially with said upper and lower portions of said column; said platform member surrounding and having a greater diameter than said upper and lower portions of said column, and projecting laterally beyond said upper and lower column portions; and auxiliary equipment for said helicopter mounted on said platform member about and close to the axis of said rotor column to minimize centrifugal forces on said equipment due to rotation thereof with said column.

References Cited by the Examiner

UNITED STATES PATENTS 2,415,584   2/47   Fleiss _____ 170—135.4

JULIUS E. WEST, *Primary Examiner.*